United States Patent [19]
Hammerschmidt

[11] 3,804,542
[45] Apr. 16, 1974

[54] JOINT CONSTRUCTION

[76] Inventor: Leo L. Hammerschmidt, 41 Mercury Dr., Florissant, Mo. 63031

[22] Filed: Nov. 15, 1972

[21] Appl. No.: 306,677

[52] U.S. Cl.................. 403/264, 256/65, 403/282, 403/193
[51] Int. Cl............................ F16b 7/00, F16b 7/18
[58] Field of Search................... 287/54 C, 56, 124; 403/187, 189, 240, 258, 259, 264, 193, 282, 284; 29/453, 521, 525, 526; 52/475, 656, 758 H

[56] References Cited
UNITED STATES PATENTS

| | | | |
|---|---|---|---|
| 3,643,989 | 2/1900 | Sattler | 287/54 C |
| 3,603,628 | 9/1971 | Smith et al. | 287/54 C |
| 3,195,937 | 7/1965 | Case | 287/54 C |
| 3,556,569 | 1/1971 | Bruhn | 287/54 C |

FOREIGN PATENTS OR APPLICATIONS

| | | | |
|---|---|---|---|
| 535,475 | 2/1955 | Belgium | 287/54 C |

Primary Examiner—Jordan Franklin
Assistant Examiner—Conrad L. Berman
Attorney, Agent, or Firm—Ralph W. Kalish

[57] ABSTRACT

A joint construction for tubular sections as formed from metal or suitable plastics, embodying a block-like connector having a configuration conforming to the geometry of the first tubular section and having exterior dimensions substantially equal to the interior dimensions of the latter for acceptance into the bore of such first tubular section. A fastener, such as a bolt, securing said connector against one side face of the second tubular section. Protrusion members provided on the exterior side faces of said connector for wall deforming engagement with said first tubular member for maintaining same stably surroundingly of said connector and with its end edge abutting against the aforesaid side face of said second tubular section when in joint formation.

4 Claims, 3 Drawing Figures

PATENTED APR 16 1974 3,804,542

JOINT CONSTRUCTION

BACKGROUND AND SUMMARY OF THE INVENTION

This invention relates in general to tubing and, more particularly, to a novel joint construction for tubular members.

Heretofore, various efforts have been undertaken to develop means for joining tubular sections in mutual axially perpendicular relationship, such as, in an L-formation or T-configuration without resort to welding or the like. However, all such previous attempts have comprehended either an extension of one tubular section into the other or companion section, as exemplified in Theisen, U.S. Pat. No. 3,227,477 and Krikorian, U.S. Pat. No. 3,519,292; or have involved the provision of registering openings in the opposed wall portions of one tubular component for projection therethrough of a fastener with the head thereof being exteriorly exposed, as revealed in Parsons, U.S. Pat. No. 3,674,293, Triplett, U.S. Pat. No. 3,333,873 and the above-mentioned Patent to Krikorian. Expectedly, the prior art joint constructions have involved special forming of the interconnected joint members.

Therefore, it is an object of the present invention to provide a mechanical joint structure for tubular sections which is substantially exteriorly undetectable, presenting a relatively smooth unbroken appearance comparable to a welded joint.

It is another object of the present invention to provide a joint for tubular components which latter may be of any desired cross sectional or geometric configuration; which may be fabricated of metals or various synthetics, and which do not require welding or adhesive means for interengagement.

It is a further object of the present invention to provide a sturdy reliable joint between tubular members, which joint may be of L- or T- character and which is suitable for a multitude of applications, including, among numerous others, the popular field of wrought iron furniture.

It is a still further object of the present invention to provide a joint structure of the type stated comprehending a unique integration of associated components which may be achieved by the average "do-it-yourself" enthusiast with hand tools as found in the usual home workshop.

It is another object of the present invention to provide a joint structure of the character stated which may be easily developed; which obviates the need for the costly services of skilled individuals and the utilization of expensive equipment, such as complex welding machines, not customarily found in the home workshop; and which may be economically accomplished with metallic or plastic members.

DESCRIPTION OF THE PREFERRED EMBODIMENT

Figure 2:
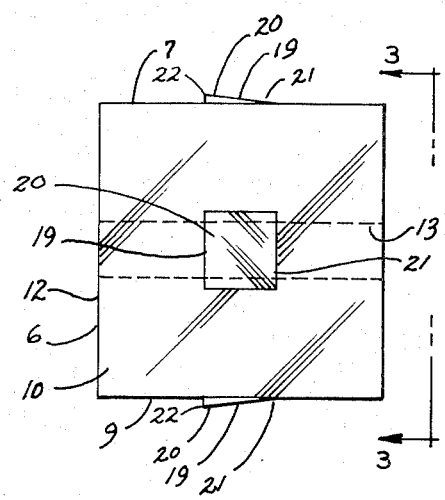
FIG. 2 is a side elevational view of the integrating connector.
Figure 3:
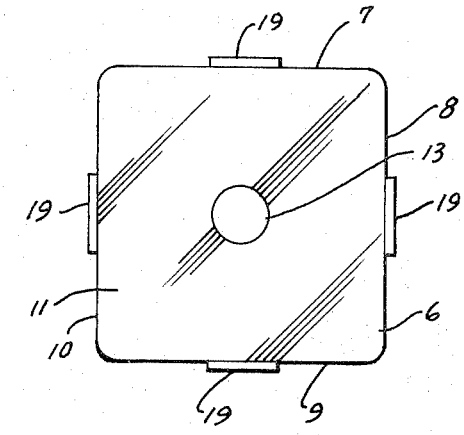
FIG. 3 is an end view of said connector taken on the line 3—3 of FIG. 2.

Referring now to the drawings which illustrate the preferred embodiment of the present invention, A generally designates a joint structure developed by tubular sections 1, 2 having bores 1', 2', respectively, which sections may be formed of any suitable, preferably extruded metal, such as aluminum, wrought iron, brass, and the like, as well as extruded plastics, such as fiberglass, etc. Said sections 1, 2 may be of any preselected cross section or geometry, such as square, round, hexagonal, rectangular, etc., and with it being understood that said sections 1,2 may be of different cross section for developing joint A. However, for purposes of illustration only, tubular sections 1, 2 are shown in the drawings as being of square cross section.

Joint A is of L- or T- configuration so that tubular sections 1, 2 are in axially perpendicular relationship; although it is recognized that in actual practice, either one may be in horizontal disposition and the other in vertical. Herein, tubular section 1 is shown as vertically disposed and with tubular section 2 being horizontally presented with its proximate end margin 3 in abutment against the outer face 4 of the confronting side wall 5 of tubular section 1.

Provided for securement to said side wall 5 of tubular section 1 and for reception within the proximate end of bore 2' of tubular section 2 is a connector 6 being of general block form and having an exterior configuration conforming to the geometry of tubular section 2, with its outside dimensions substantially equivalent to the inside dimensions of bore 2' for snug jam-fitting relationship therein. Thus, in the drawings, connector 6 is illustrated as being of square block form for correspondence to bore 2' and embodies exterior side faces 7, 8, 9 and 10 and opposed, normally inner and outer end faces 11, 12. Along its longitudinal axis, connector 6 is provided with a smooth-walled bore 13 of commensurate diameter for tightly receiving the stem 14 of a bolt 15; said latter having a threaded end 16 engageable within a tapped aperture 17 in wall 5 of tubular section 1. Aperture 17 is desirably located intermediate the side margins of wall 5 so that the proximate end face 12 of connector 6 will be assured of full abutment against tubular section wall 5. Thus, the head 18 of bolt 15 will be tightly engaged against the outer end face 11 of connector 6. Said connector 6 may be formed of any suitable rigid material such as metal, thermosetting plastic, or the like which is resistant to deformation and stronger than the side wall of tubular section 2.

On each of its side faces 7, 8, 9, 10, preferably centrally thereof, connector 6 mounts a protruding member 19 which embodies an inclined outer surface 20, the inner, lower or leading edge 21 of which is parallel to the rearward end margin of the related side face of connector 6 and the outer, upper end edge 22 extends planarwise perpendicularly from the plane of the associated connector side face. Said protruding members 19 may be integrally formed with connector 6, as by casting or molding, or may be individually fabricated and secured in any conventional manner, such as by a fastener, adhesives, or the like as may be indicated from the materials of use. Said protruding members 19 are more rigid than the wall of tubular section 2 so that upon forced engagement therewith, the contacting portion of the wall of tubular section 2 will be deformed with consequent outward bulging, as at 23.

Figure 1:
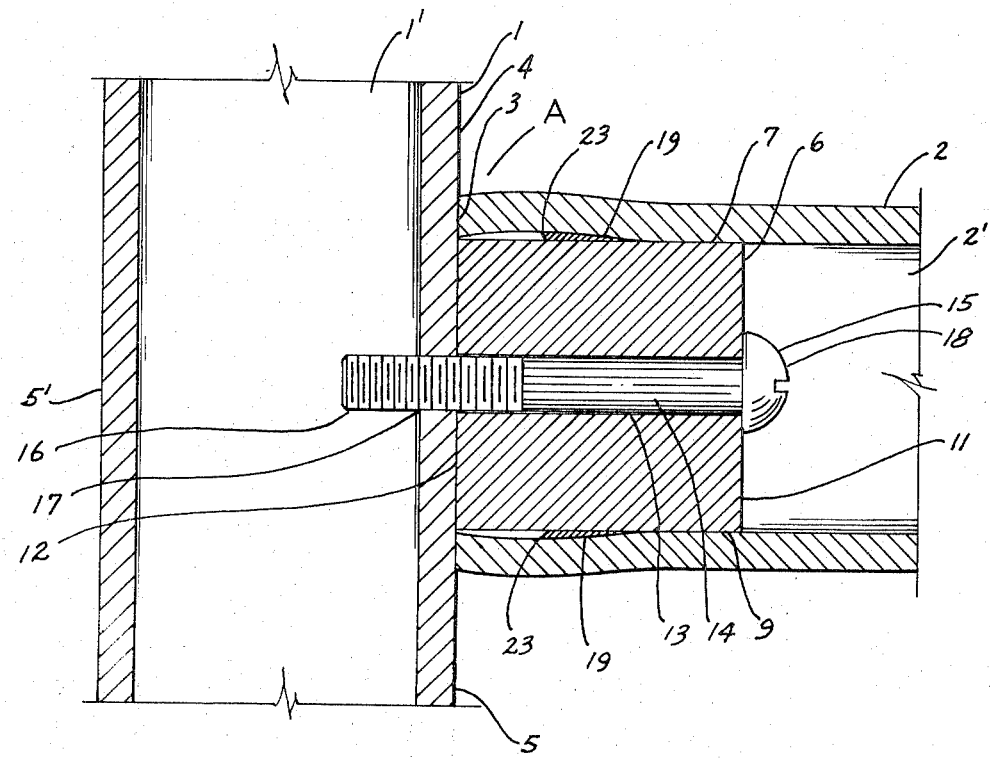
FIG. 1 is a vertical sectional view of tubular sections interconnected to form a joint constructed in accordance with and embodying the present invention.

Thus, in developing joint A connector 6 is secured to side wall 5 of tubular section 1 through appropriate tightening of bolt 15 so that said connector is firmly in position. It is to be particularly noted that the opposed or outer side wall 5' of tubular section 1 is unbroken. As a matter of fact, the threaded end 16 of bolt 15 projects but a limited extent into bore 1' of tubular section 1 (see FIG. 1). With connector 6 thus stably mounted upon tubular section 1, the operator addresses the end of tubular section 2 to connector 6 so that end margin 3 is in surrounding relationship to inner face 11 of connector 6. Thereon by applying force to the opposite end of tubular section 2, as by a mallet, hammer, or the like, said tubular section 2 is caused to move relatively along the outer faces of connector 6. The portions of the wall of tubular section 2 confronting protrusion members 19 will be in relative wedging engagement therewith being outwardly deformed traveling upwardly along inclined surface 20. By virtue of the relative extent of protrusion members 19, only limited portions of the side wall of tubular section 2 will be expandedly deformed so that the end margin 3 will, when in abutting relationship against the side wall 5 of tubular section 1, also be in substantial intimate surrounding relationship to the proximate end face 12 of connector 6.

In view of the foregoing, it is indeed apparent that the unique wedging action developed by protrusion members 19 promotes a secure, reliable, interengagement with tubular section 2 which is resistant to parting without the application of forces of a magnitude much greater than those encountered in the use to which the joint might be subjected. Joint A is thus entirely of mechanical character, there being no need to resort to welding or to the utilization of adhesive means. From the exterior, there is no visible suggestion whatever as to the means by which tubular sections 1, 2 are joined so that a very pleasing appearance is provided. As demonstrated by the foregoing, a few turns of a screwdriver followed by a relative few blows from a hammer will produce joint A so that the development of the same is within the capacity of the average do-it-yourself enthusiast.

As indicated above, connector 6 may be of any suitable cross sectional character for conformity to that of tubular section 2 so that the present invention is equally useful with tubing of any preselected geometry.

In view of the foregoing it is, of course, apparent that the elements forming the joint need not necessarily be of tubular construction; that is, tubular section 1 could be replaced by a solid rod having merely a tapped opening and tubular section 2 could be solid throughout the major portion of its length, but be provided with a recess at its one end for accepting the connector; with the walls of said recess being of strength relative to connector 6 for requisite deformation.

Having described my invention, what I claim and desire to obtain by Letters Patent is:

1. A joint structure comprising a first elongated hollow tubular member, a second elongated hollow tubular member capable of being deformed and disposed in axially perpendicular relationship to said first elongated member, each of said first and second elongated members having side-wall forming portions, said second elongated member being open in its end portion adjacent said first elongated member, a block-like connector having a body, said body being of complementary contour to the interior of the side wall of said second elongated member, said body having cross sectional dimensions substantially corresponding to the internal dimensions of said second elongated member, said body being formed of material resistant to deformation and being stronger than the material of the side wall of said second elongated member, said connector body being received within the end portion of said second elongated member adjacent said first elongated member, fastener means fixedly engaging said connector to the confronting portion of the side wall of said first elongated member whereby said connector is maintained against such confronting portion, and solid wedge-like, substantially unyielding elements resistant to deformation and provided upon the exterior surface of said connector body and projecting therefrom, said elements being of material stronger than the side wall of said second elongated member, the transverse distance between opposed elements being greater than the internal cross section of said second elongated member with said connector body being received within said second elongated member said elements forcibly and permanently deforming the engaged contiguous portions of the side wall of said second elongated member for stabilizing said connector body against inadvertent displacement.

2. A joint structure as defined in claim 1 and further characterized by said fastener means comprising said body having a coextensive longitudinal bore, said first elongated member having an opening registering with said bore, a fastener member projecting through said bore and said aperture and means engaging said fastener to said first elongated member.

3. A joint structure as defined in claim 2 and further characterized by said means engaging said fastener to said first elongated member comprising said fastener having external threads, said elongated member aperture being internally threaded for engaging the threads of said fastener.

4. A joint structure as defined in claim 1 and further characterized by said connector body being of solid formation.

* * * * *